Figure 1:
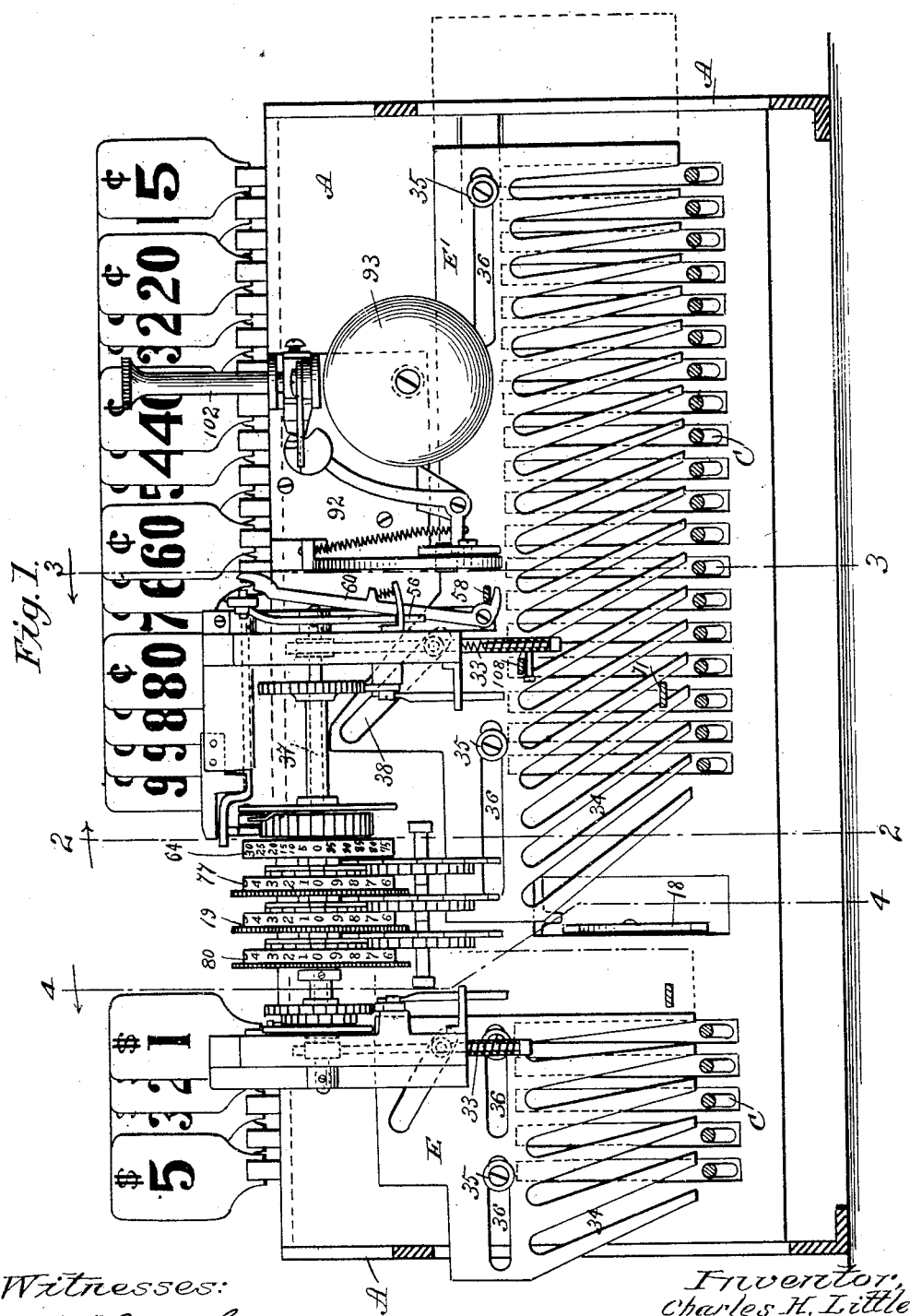

(No Model.) 5 Sheets—Sheet 2.
C. H. LITTLE.
CASH REGISTERING AND INDICATING MACHINE.

No. 584,745. Patented June 15, 1897.

Witnesses:
J. W. Gorfield
K. J. Clemons

Inventor:
Charles H. Little
by Chapin & Co.
Attorneys.

(No Model.) 5 Sheets—Sheet 3.

C. H. LITTLE.
CASH REGISTERING AND INDICATING MACHINE.

No. 584,745. Patented June 15, 1897.

Witnesses:
J. D. Garfield
H. J. Clemons

Inventor,
Charles H. Little,
by Chapin & Co.
Attorneys.

THE NORRIS PETERS CO., PHOTO-LITHO., WASHINGTON, D. C.

(No Model.) 5 Sheets—Sheet 4.

C. H. LITTLE.
CASH REGISTERING AND INDICATING MACHINE.

No. 584,745. Patented June 15, 1897.

Witnesses:
J. W. Garfield
H. I. Clemons

Inventor:
Charles H. Little
by Chapin & Co
Attorneys (No Model.)  5 Sheets—Sheet 5.
C. H. LITTLE.
CASH REGISTERING AND INDICATING MACHINE.
No. 584,745. Patented June 15, 1897.
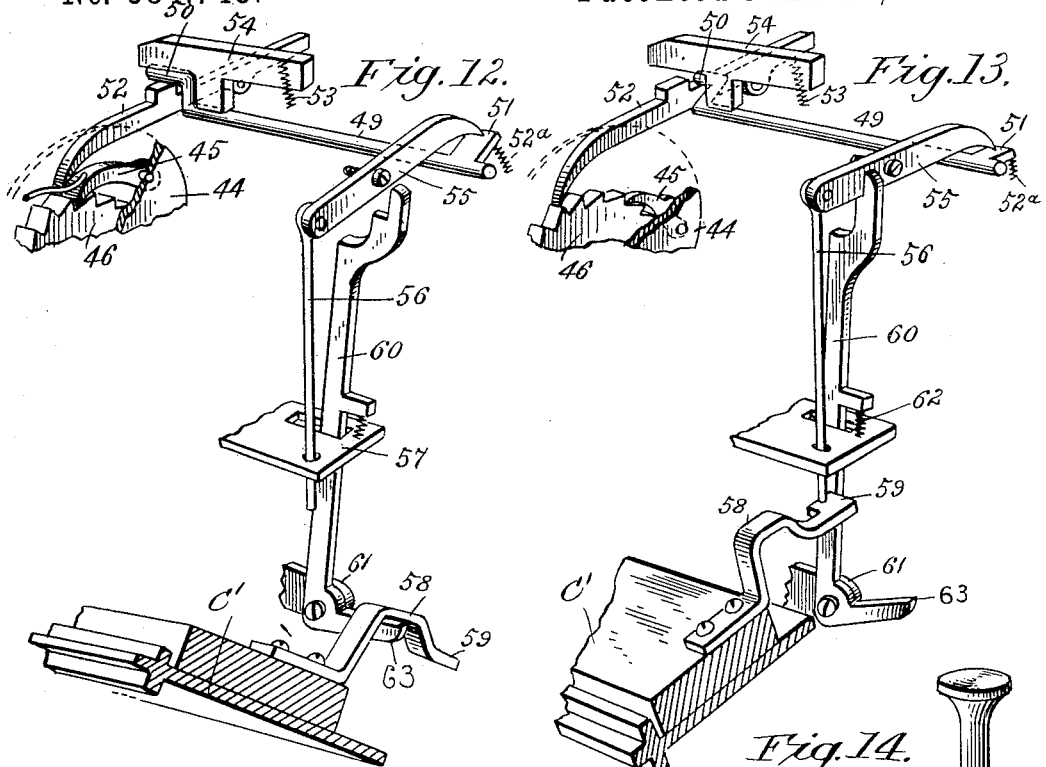
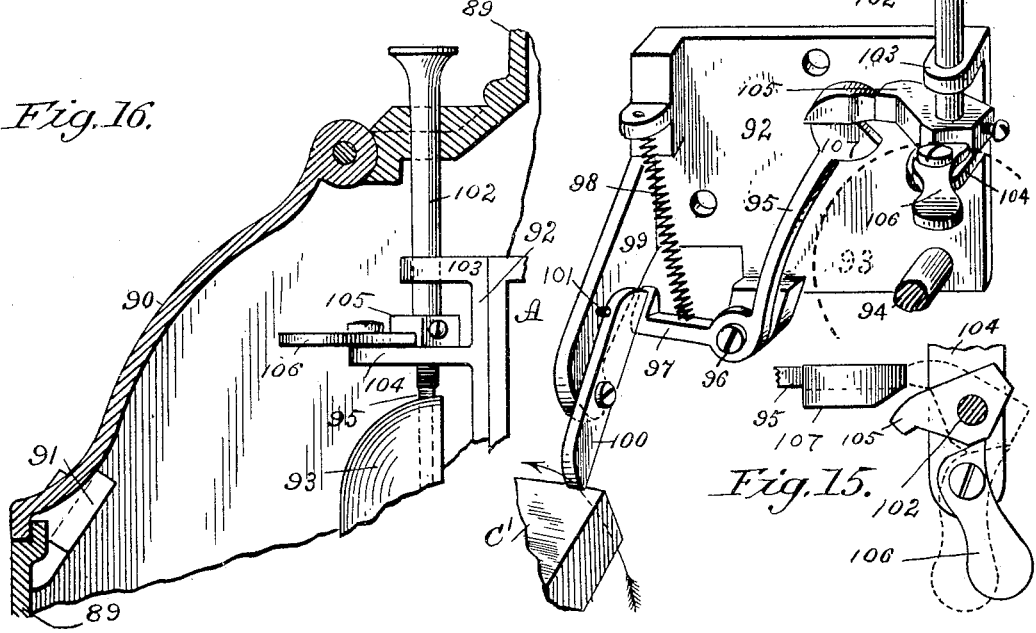
Witnesses:
J. W. Garfield
H. I. Clemons
Inventor,
Charles H. Little,
by Chapin & Co
Attorneys.

UNITED STATES PATENT OFFICE.

CHARLES H. LITTLE, OF MELROSE, MASSACHUSETTS, ASSIGNOR TO ROBERT F. HERRICK, TRUSTEE, OF MILTON, MASSACHUSETTS.

CASH REGISTERING AND INDICATING MACHINE.

SPECIFICATION forming part of Letters Patent No. 584,745, dated June 15, 1897.

Application filed May 4, 1896. Serial No. 590,093. (No model.)

*To all whom it may concern:*

Be it known that I, CHARLES H. LITTLE, a citizen of the United States, residing at Melrose, in the county of Middlesex and State of Massachusetts, have invented new and useful Improvements in Cash Registering and Indicating Machines, of which the following is a specification.

This invention relates to cash registering and indicating machines, whereby the amount to be registered by said machine is displayed on indicators brought conspicuously into sight by the depression of keys numbered to correspond to the displayed indicators.

The invention relates particularly to devices for the prevention of the manipulation of the parts thereof for the purpose of effecting false registration, and to the mechanism pertaining to the operation of the counting and registering mechanism, and more particularly to the operation of a single registering and indicating device for receiving amounts from more than one key-bank, which device is also a total-adder.

It has been customary heretofore to provide a registering and indicating mechanism for each bank of keys; but my invention provides for the construction of one single registering and indicating device, which is also a total-adder, and whereby separate amounts from either key-bank may be registered separately and their totals carried through the various registering-wheels by transfer from one to the other, or whereby a compound amount received partly from one bank and partly from another may be registered and similarly transferred as a total in the same mechanism as separate amounts are received and transferred to their proper places on the said registering-wheels.

In the drawings most of the outer casing of the machine is omitted.

Figure 2:
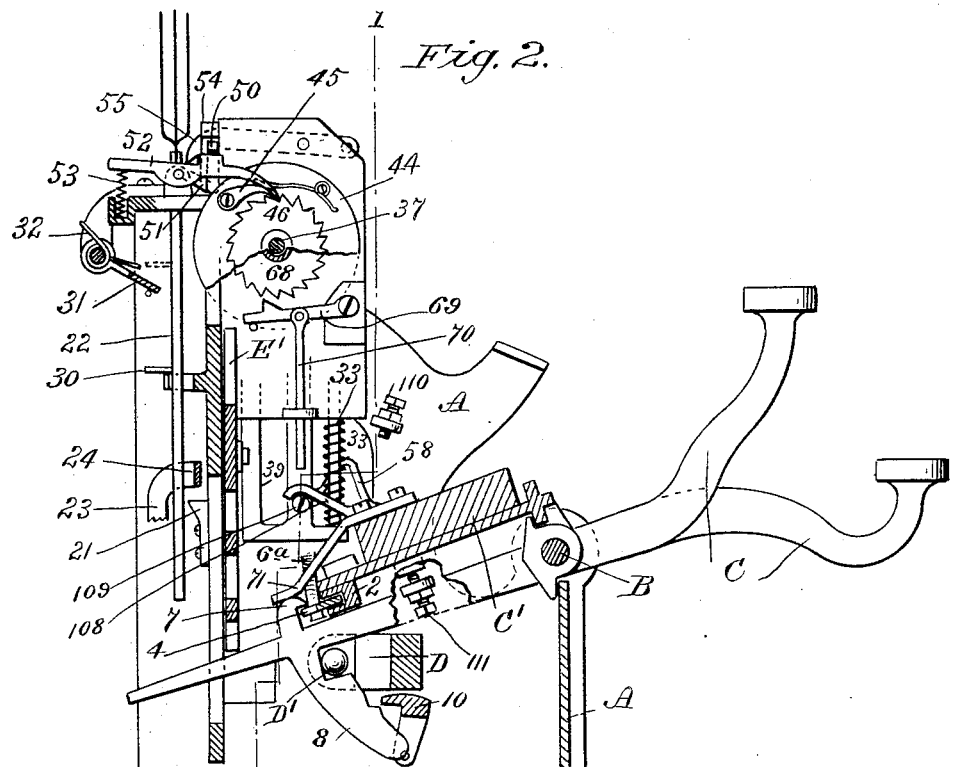
Figure 3:
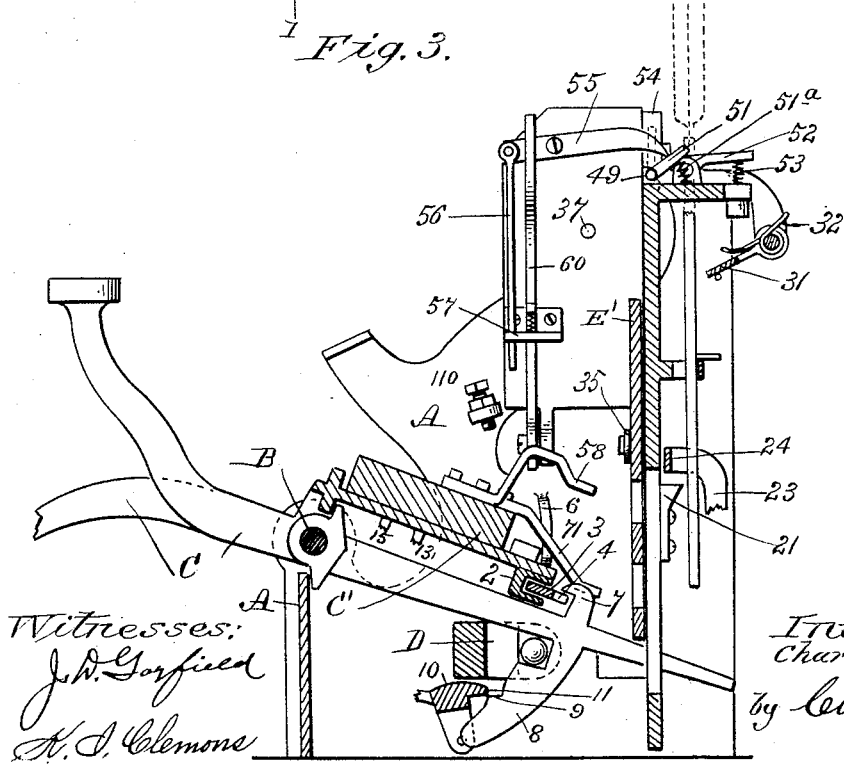
Figure 4:
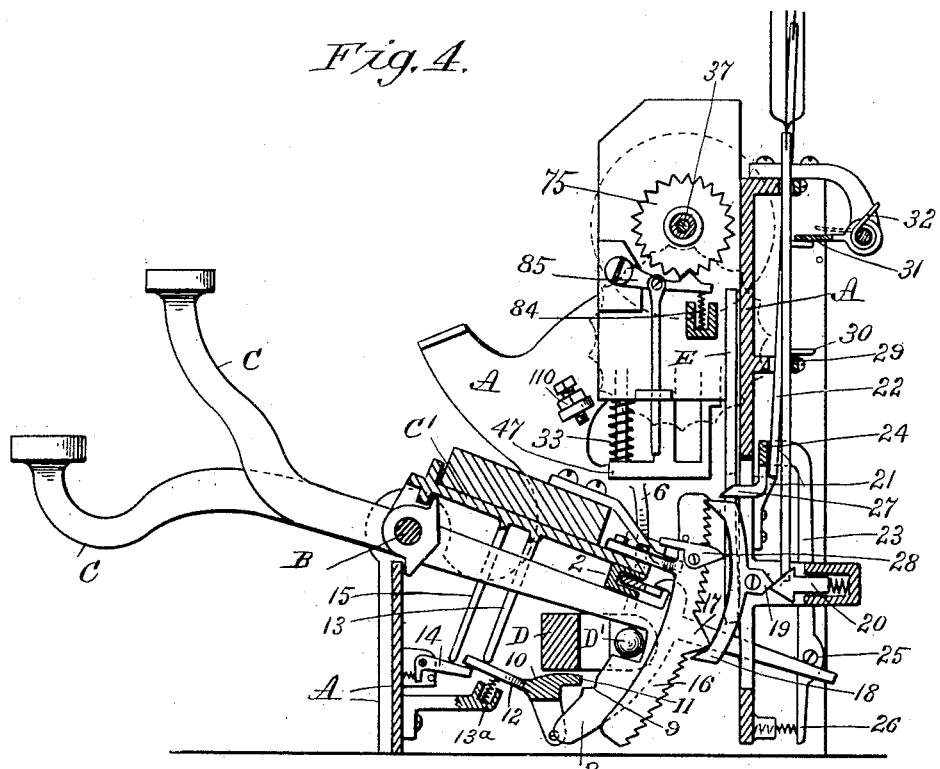
Figure 6:
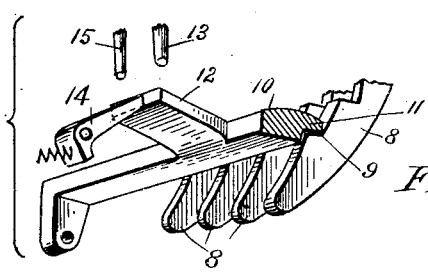
Figure 5:
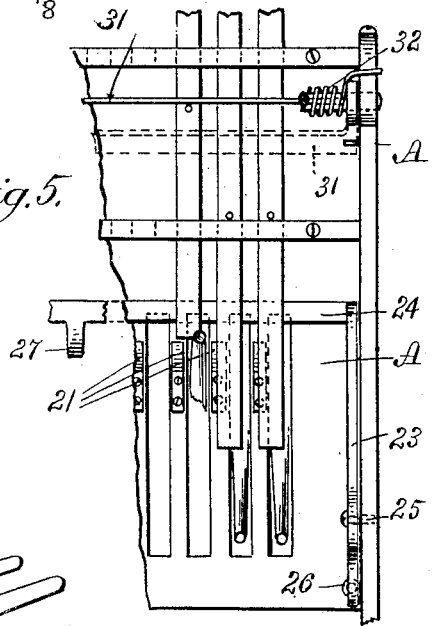
Figure 7:
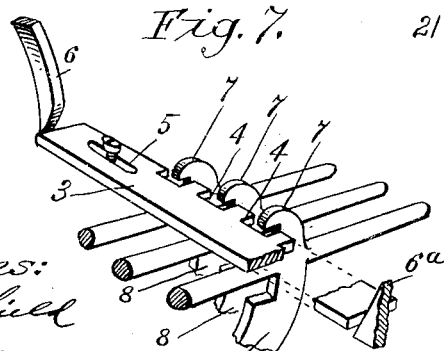
Figure 8:
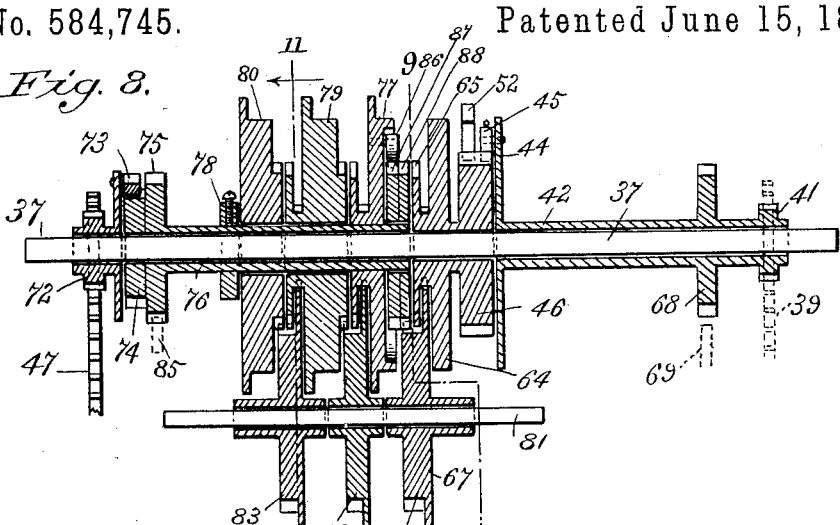
Figure 9:
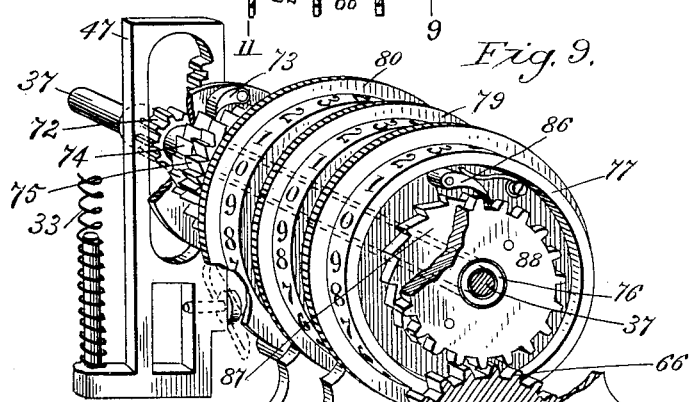
Figure 11:
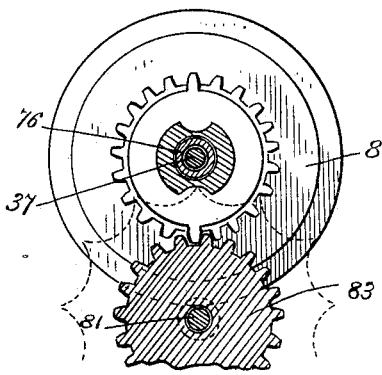
Figure 10:
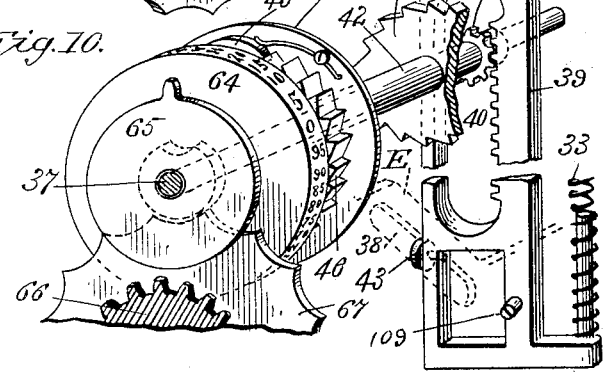

Figure 1 is a front sectional elevation of a cash-registering machine, taken on line 1 1, Fig. 2. Fig. 2 is a cross-sectional elevation on line 2 2, Fig. 1, looking in the direction of the arrow on said Fig. 1. Fig. 3 is a cross-sectional elevation on line 3 3, Fig. 1, looking in the direction of the arrow on said Fig. 1. Figs. 2, 3, and 4 include the portions of the mechanism not shown in Fig. 1, the section-lines on said figure indicating more particularly the planes in which said sectional views lie. Fig. 4 is a cross-sectional elevation on line 4 4, Fig. 1, looking in the direction of the arrow in said figure. Fig. 5 is a rear elevation of a portion of one end of the machine, showing mechanism for operating the tag-rods. Fig. 6 is a perspective view of mechanism for immovably holding all the keys of a bank except the one depressed by the operator. Fig. 7 is a perspective view of portions of the key-coupling mechanism whereby an operated key is coupled to the rocker-bar. Fig. 8 is a sectional view, in a vertical plane, of the counting and registering mechanism. Fig. 9 is a perspective view, looking to the left of line 9 of Fig. 8, of a part of the counting and registering mechanisms, showing more particularly the means of operating the dollar-registering devices. Fig. 10 is a view similar to Fig. 9, looking to the right of line 9, Fig. 8, showing more particularly the means of operating the five-cent-registering devices. Fig. 11 is a sectional view on line 11, Fig. 8, showing one of the two-toothed transfer-wheels at the moment of transfer from one wheel to another. Figs. 12 and 13 show means, respectively, of locking and releasing the pawl of the five-cent-registering devices at the extreme upward and downward limit of movement of the rocker-plate. Fig. 14 is a perspective view of the bell-operating mechanism and means for preventing the function of said mechanism, if desired. Fig. 15 is a plan view of a portion of said mechanism. Fig. 16 is a transverse section of a portion of the case of a cash-registering machine and showing the relation of the bell-ringing devices thereto.

In the drawings, A represents the frame of a cash-registering machine, across the front of which and secured to the side plates of said frame extends the key-shaft B, having the keys C pivoted thereon. Said keys are divided into two banks, one for registering dollar amounts and one for registering fractional parts of one dollar. A rocker-plate C' extends across the keys of both banks and is operated by both sets of keys, said plate having a pivotal connection with the key-shaft B.

The well-known means of preventing the operation of more than one key of a bank at one time, consisting of the slotted holder D, having balls D' therein, is also embodied in this machine and requires no detailed description. A series of said balls is provided for each of said key-banks.

Under the forward edge of the rocker-plate C' and secured thereto is a grooved bar 2, of the same length as said rocker-plate, and in said groove in the bar 2 is located the plate 3, having in its free edge the rectangular notches 4. Said plate 3 has a free endwise sliding movement in said bar 2 and is held in place therein by screws passing through said grooved bar 2 and through the slots 5 in said plate. (See Fig. 7.) Endwise movement is imparted to said plate 3 in both directions by two cam projections 6 and 6ª, located at each end of said plate 3 on the side frames of the machine. Said cam projections are oppositely arranged as regards the direction of their inclined faces, cam 6, Fig. 7, operating to throw the plate 3 to the right when a key is depressed and cam 6ª operating to throw said plate back again to its normal position when the rocker-plate, which has been raised by a key, returns again to its position shown in Figs. 2, 3, and 4. On said keys C and in proximity to said plate 3 are the hooked arms 7, the hooked part of which projects over the edge of said plate 3, said hooked part lying normally above the notches 4 cut therein.

When a key is depressed, the rocker-plate, the grooved bar 2, and plate 3 are carried upward thereby. As said parts rise and the hooked arm 7 of the key being operated is raised above the line of the similar arms on the rest of the keys the end of plate 3 encounters the cam 6 on the frame and is given endwise movement sufficient to bring one of the projections on the edge of the plate 3 (made by the cutting of the notches 4) under the hooked arm 7 of the key, thereby coupling together the rocker-plate and the key being operated.

The key-levers are provided with the downhanging wings 8. In the edge of said wings are cut the notches 9. (See Figs. 2, 3, and 4.) A rocker-bar 10 is pivoted by each end to the frame of the machine, said bar having a projecting edge 11 thereon, and from the side opposite said edge 11 one or more arms 12, against which the downwardly-projecting rod 13, attached to the under side of the rocker-plate, normally impinges to hold said bar 10 out of engagement with the notches 9 in said wings 8 of the keys. Whenever a key is depressed, a spring 13ª, acting on the under side of arm 12, causes said bar 10 to be swung forward, engaging all of the notches 9 in said wings except the one or more which have been raised. As soon as said bar 10 is so released and is swung over by the action of its said spring against said wings it is locked in that position by the lever 14, actuated by a spring normally under tension, as shown, which throws said lever 14 upward to a point which brings its end opposite the end of said arm 12, whereby the bar 10 is securely held in engagement with the notches in said wings 8 and all the key-levers except those operated upon are secured against an upward movement. The degree of movement of said lever 14 is determined by a suitably-placed pin, against which the short arm of said lever impinges. Secured to the under side of the rocker-plate near said rod 13 is a second rod 15, slightly longer than rod 13, which, when said rocker-plate returns to its normal position, strikes the lever 14 just before the said rod 13 strikes the arm 12 and thereby disengages said lever 14 from the said arm 12 and leaves said bar 10 free to be forced backward and disengage its projecting edge 11 from the wings 8 of the key-levers. (See Figs. 4 and 6.)

Secured to the free edge of the rocker-plate is the sector 16, whose outer edge is concentric with the key-shaft B. Said sector is provided on its outer edge with two series of teeth pointing in opposite directions, between which is situated an oppositely-faced cam-point 17 for acting against the ends of a double-ended pawl 18, which engages alternately with the teeth of said sector on each side of said cam-point. Said pawl 18 is suitably pivoted to the frame of the machine and opposite its pivotal point has a rearwardly-projecting cam-point 19. Within a suitable socket is a spring-actuated cam-point 20, which engages alternately with each side of said cam-point 19 to hold one end or the other of said pawl in engagement with one side or the other of said segmental ratchet.

The cam-point 20 is always in engagement with that side of the cam-point 19 which is located on the free end of the pawl 18 and is forced over said point 19 to the opposite side thereof only when the cam-point 17 strikes the engaged end of the pawl at the extreme limit of movement of said sector 16. Therefore it will be seen that this device entirely prohibits so-called "pumping," for the sector once started on either the up or the down stroke such stroke must be completed before the disengagement of the pawl therefrom can be effected.

The vertical slots in the frame A are provided for guiding the key-levers in their upward movements and restraining them against lateral movement when in engagement with the cam-plate, &c. On that portion of said plate between the slots and at a point near the upward limit of movement of the key-levers are secured the small brackets 21 near the upper ends of said slots, on which the ends of the indicator-rods 22 are supported when they have been raised by the key-levers. Said indicator-rods are made square to prevent their rotation within their supports. By referring to Fig. 5 it will be seen that the said indicator-rods 22 are so located relative to said slots in the frame A that substantially only half of the width of the rods lies opposite said slots, to the end that the key-levers shall only bear on a portion of the ends thereof, leaving a portion to engage with the said brackets 21.

Pivotally secured to the ends of the frame A is a frame consisting of the two vertical arms 23, having secured to their upper ends the "knocking-off" bar 24, which passes behind the line of indicator-rods close to the frame A, the position and shape of said parts 22 and 23 being indicated by portions thereof in Figs. 2 and 3 and more fully in Figs. 4 and 5. Said arms 23 are pivoted to the frame A near their lower extremities at 25, and a suitable spring 26 acts to keep said knocking-off bar closely against the frame A.

Secured to the bar 24 and projecting at right angles therefrom is the short arm 27. Said horizontal portion of said arm extends outwardly at right angles, as aforesaid, in such position as brings it near and to one side of the path of movement of the sector 16, to the side of which is secured the pivoted latch 28. Said latch is so pivoted to the sector 16 that when the latter is moving upward the latch thereon is immovable on its pivot. In the course of said upward movement of the ratchet the said latch strikes the short arm 27 aforesaid, attached to the knocking-off bar 24, causing the latter to oscillate on its pivot 25 in a direction away from said frame A, against which it lies, thereby disengaging the lower ends of any of the indicator-rods 22 which may be resting on the brackets 21 and allowing them to drop down into the case of the machine out of sight. A bar 29, extending lengthwise across the machine, is suitably notched to receive the said indicator-rods and keep them in vertical alinement, and suitable pins 30 in said indicator-rods, projecting at right angles therefrom, limit their downward movement, as desired, by coming in contact with said bar 29. Another function of said pins 30 is to lift a spring-held wing or rod 31, which extends across the machine lengthwise (see Figs. 2, 3, 4, and 5) in such a position that said pins 30 contact therewith nearly at their extreme limit of upward movement, lifting said wing 31 from the position shown in Figs. 2 and 3 to that shown in Fig. 4, said upward movement contracting the spring 32 on the rod on which said wing oscillates, which rod is supported by bracket-arms from the frame A. Thus it will be observed that whenever an indicator-rod is lifted by the depression of a key its final upward movement is against the action of spring 32, which causes said rod to more surely slide down the upwardly-inclined end of the key-lever by which it is raised, which is the position all of the said key-levers assume at their extreme upward limit of movement. When the lower ends of said indicator-rods, under the impulse of said spring 32 and gravity, slide down said inclined edge of the key-levers, they are landed on one of the brackets 21 on the frame A, only about one-half of the area of the lower ends of the said rods resting on said brackets, as aforesaid, and held there mainly by the tension of said spring, the key-lever being returned by the weight of the rocker-plate C' to its normal position, assisted by the action of the compressed springs 33, carried by another part of the mechanism, which will be described farther on.

Sufficient freedom of movement is given to the indicator-rods in all of their supports to permit the ends of said rods to move in a direction at right angles to said knocking-off bar to engage with and be disengaged from the said brackets 21. It will be observed that the end of an ascending indicator-rod is lifted somewhat above its bracket 21 before it is allowed to descend thereon. Said latch in its downward movement when it strikes the arm 27 of the knocking-off bar oscillates on its pivot-pin and passes the said arm without imparting any movement thereto.

In this machine two slotted cam-plates E E' are used, one for each bank of keys, for transforming the upward movement of the key-levers into a horizontal movement of said cam-plates, whereby the counting and registering devices are actuated, all as more fully described hereinafter. Said cam-plate E is operated by the dollar-bank of keys and cam-plate E' is similarly operated by the five-cent bank of keys. This form of cam-plate having been incorporated in various preceding patented constructions, (see patent of July 24, 1894, No. 523,611, to Jerome J. Webster,) a detailed description thereof is not called for.

It is deemed sufficient to say that the oblique cam-slots 34 thereof, terminating just above the ends of the key-levers and arranged to be engaged by said levers when they are moved upward, determine by the degree of their pitch or inclination the amount of horizontal movement which shall be imparted to said plate, as the key-lever moving upward and rigidly held to a vertical movement by the slotted frame A encounters the inclined side of said cam-slots 34. When said key-levers are returned to their normal position by the rocker-plate, they do not act on the cam-plate to return said plate to its normal position. Provision is made for returning said cam-plates to their positions by a hook-lever 108, secured to the rocker-plate engaging with the stud 109, secured to the side of the rack-frames 39 and 47, said return movement being assisted by the action of springs 33 on said rack-frames. These devices are clearly shown in Fig. 2.

Secured to the side frames A of the machine are two adjustable stops for each end of the rocker-plate—one, 110, to limit its upward movement and one, 111, to limit its downward movement. Said stops consist of lugs cast on the frame of the machine, having a suitably-threaded hole therethrough in which is a screw, by means of which the upward or downward movement of said rocker-plate is controlled. On each of said screws is a check-nut.

By providing the above-mentioned stops it becomes unnecessary to finish the upper ends of the oblique cam-slots 34 in the said cam-plates or of the slots in the guide-plates, thereby saving largely in the expense of the manufacture of said plates. Both of the said cam-plates are hung on screws 35, entering the frame of the machine, passing through slots 36 in said plates, said slots being of sufficient length to permit the free endwise movement of the cam-plates to the fullest extent of any motion imparted thereto by any one of the said keys C.

The counting and registering mechanism is mounted on a shaft 37, rigidly secured to the frame A. Said mechanism consists of two groups—viz., that for registering amounts of five cents or multiples thereof, which is operated by the cam-plate E', and that for registering the dollar amounts, which is operated by the cam-plate E. The amounts from the dollar key-bank are registered directly on the unit dollar-wheel 77, and the amounts from the five-cent key-bank are transferred directly to the said unit dollar-wheel from the wheel 64 and added to the amount already registered thereon. Thus one counting and registering mechanism answers for adding and registering amounts from two key-banks of the machine and is equally applicable to machines having more than two banks, if desired. Each of these groups of mechanism consists of ratchet-wheels and pawls therefor, registering-wheels, and transfer-wheels, which will be described more fully farther on, and rotational movements are imparted thereto by rack-and-pinion devices operated by the two cam-plates E E' and are constructed as follows: In an upwardly-projecting part of the cam-plate E' is an inclined cam-slot 38. A vertically-moving rack-frame 39 (shown in perspective in Fig. 10) has provided therein an internal rack 40, with which engages a pinion 41, rigidly secured to a sleeve 42, rotatably mounted on the shaft 37. The said vertical movement is imparted to the said rack-frame by a stud 43, carrying an antifriction-roll secured to the edge of said rack-frame on the side thereof next to said cam-plate E' and lying within the slot 38 thereof. Any desired degree of vertical motion relative to the lateral motion of said cam-plate (within certain limits) can be obtained by varying the angle of inclination of said cam-slot 38. When said cam-plate is moved to the right, (see Fig. 1,) the said cam-slot 38 raises said rack-frame by means of the stud 43 engaging therewith, the amount of said rise being determined by the degree of lateral movement of said cam-plate E'. As said rack-frame rises the pinion 41, engaging with the rack therein, is revolved, and the sleeve 42, to which it is secured, revolves with it. Said sleeve carries on one end thereof a pawl-disk 44, and pivotally secured to said disk, near the periphery thereof, is the pawl 45, engaging with the teeth of a ratchet-wheel 46. Said ratchet-wheel 46 is made with a sufficiently-wide face to accommodate a second pawl 52 thereon, which is purely a locking-pawl and is pivoted to the ledge formed on the top of the frame A, through which the indicator-rods pass, and under the rear end of said pawl is located the spring 53, which holds said pawl continuously in engagement with the ratchet-wheel 46 and is designed to hold said ratchet against all movement except during the downward movement of the rocker-plate C', by which the counting and registering devices are operated. This locking and unlocking of said ratchet-wheel is for the purpose of preventing the overthrow of said ratchet when a key is struck violently, and it takes place as follows: The rock-shaft 49 is pivotally supported in suitable bearings on the top of the frame A for a reciprocatory rotary movement therein. Said rock-shaft has on one end thereof a crank-arm 50 and on the other end thereof a short arm or plate 51, which is located at a suitable angle to said crank-arm, and on the under side of plate 51 is the spiral spring $52^a$. This rock-shaft 49 is so placed that the crank-arm 50 thereof has its swinging motion at right angles to and directly over the locking-pawl 52 of said ratchet-wheel 46. A rigid arm 54, secured at any convenient point to the frame A and parallel to and directly above said rock-shaft, has a depending portion therefrom which nearly contacts with the upper side of the said rock-shaft. Between the under side of said arm 54 and the top of the projection on the upper side of the pawl 52 there is only sufficient room to permit the easy entrance of the end of the crank-arm 50 therebetween when said rock-shaft is partially rotated to bring said crank-arm to a vertical position. It will be seen that when such movement of the rock-shaft takes place the locking-pawl 52 holds said ratchet 46 against rotation in either direction, and this locking takes place at the extreme limit of movement imparted to said ratchet by the pawl 45, and always occurs at the end of said movement, whether said ratchet-wheel is moved one or several notches by said pawl. The means for accomplishing the reciprocating rotary movements of said rock-shaft at the proper times consist of a lever 55, pivoted to the side of the slideway in which moves the rack-frame 39. One end of said lever is curved downwardly and bears on the short arm 51 of the rock-shaft 49, and its opposite end has pivotally secured thereto a depending rod 56, whose lower end passes through a plate 57, secured also to the side of the slideway of the rack-frame 39. On the top of the rocker-plate C' is secured the hook-arm 58, which has a double function—viz., its free end 59 is designed to strike the end of the rod 56 as the rocker-plate nearly reaches the end of its upward movement, which thereby raises one end of the lever 55 and depresses the other curved end, which, lying in contact with the arm 51 of the rock-shaft 49, causes the crank-arm 50 thereof to move out from between the top of the locking-pawl 52 and the rigid arm 54, thereby releasing the ratchet-wheel 46 from restraint of said pawl 52. As soon as this movement takes place the swinging vertical lever 60, pivoted at its lower extremity to a short arm 61, projecting from the said slideway for the rack-frame, being released from the pressure of said hook-arm 58, is impelled by its spring 62, which is located under a short arm projecting at right angles from said lever 60, a short distance above the place where said lever passes through the fixed plate 57, to swing over under the lever 55 in such position as to cause the said lever to be locked in the position shown in Fig. 13, and thereby hold said crank-arm 50 out of engagement with the top of the locker-pawl 52 until said hook-arm 58 is returned again to the position shown in Fig. 12 by the descent of the rocker-plate to its normal position, said arm 58 when so descending engaging with the bell-crank lever 63, projecting from the lower extremity of said swinging lever 60, and thereby disengaging its upper extremity from the lever 55, whereupon the spring 52ª, under the end of the arm 51 of the rock-shaft 49, rotates said rock-shaft and causes the crank-arm 50 to move between the top of the locking-pawl 52 and the fixed arm 54 and lock said pawl in engagement with a tooth of its ratchet-wheel.

Returning now to the operation of the counting mechanism, it has been said hereinbefore that the movement was imparted to the pawl-carrying disk 44 on the sleeve 42 by its pinion on the end thereof engaging with rack-frame 39 and that said pawl 45 on said disk 44 rides over the teeth of its ratchet-wheel, which is firmly locked on the upstroke of the rack-frame and is unlocked long enough on the downstroke for the pawl 45 to impart thereto its requisite movement. Said ratchet-wheel is but one part of an element consisting of said ratchet-wheel 46, a registering-wheel 64 for five-cent amounts and multiples of five up to one hundred, and a one-tooth transfer-disk 65, (see Fig. 10,) all one rigid element fitting loosely on said fixed shaft 37 and restrained against rotation on said shaft by said locking-pawl 52 and a locking-wheel 67. The rotation of the ratchet-wheel 46 therefore causes like movement of the registering-wheel and the single-tooth transfer-wheel.

As in all counters of this class, when the registering-wheel 64 has made one revolution the single-tooth transfer-wheel 65 engages with a tooth of the gear-wheel 66 and rotates said gear and the locking-wheel 67, to which it is attached, one notch, said locking-wheel being made with segmental locking-scallops which fit the periphery of a small hub on the registering-wheel, said hub being cut away at a point in line with the tooth of the transfer-disk to allow said locking-wheel to pass said hub.

Means for preventing the pawl-disk from picking up more of the ratchet-teeth than it is designed to engage when moved backward over said teeth are provided by securing a ratchet-wheel 68 (see Figs. 2, 8, and 10) to said sleeve 42, which, at the limit of the said backward movement of said pawl-disk, becomes engaged with a pawl-lever 69, (see Fig. 2,) hung on the side of the slideway of rack-frame 39 in a suitable position under said ratchet-wheel 68, which lever 69 has a rod 70 depending therefrom in a position over an arm 71 on the rocker-plate, whereby when said rocker-plate is raised by the depression of a key it at the proper time encounters the end of said rod 70 and, moving it upward, causes said pawl-lever 69 to engage one of the teeth of the ratchet-wheel 68 and lock it. Thus it will be seen that means for preventing the overthrow of the ratchet-wheel 46 and means for preventing the backthrow of the pawl-disk 44 have been provided. Said locking of the pawl-disk 44 takes place only at the extreme upward limit of movement of the rocker-plate C', and the unlocking of said disk takes place upon the first downward movement of said plate.

Referring now to the end of said counting mechanism actuated by the rocker-plate of the dollar-bank of keys, movement is imparted to that group of mechanism by means of a rack-frame 47, actuating a pinion 72, loose on shaft 37, in the same manner as the counting and registering mechanism for the five-cent bank of keys is operated, except that the dollar end of the counter is operated on the upstroke of the rocker-plate instead of on the downstroke, as in the former case. When said rack-frame 47 moves upward, the pinion 72 and its pawl-disk, carrying the pawl 73, rotate, and said pawl is in positive engagement with its ratchet-wheel 74, which in turn is secured to the larger star-wheel 75, located next to it, which wheel 75 is integral with a long sleeve 76, rotatable on the shaft 37. Therefore the upward movement of the rack-frame 47, through the above-named parts, rotates said sleeve 76, near the end of which (opposite to that on which is secured the ratchet 74) is secured the first dollar-registering wheel 77. Loose on said sleeve and between said registering-wheel 77 and a collar 78 are two other registering-wheels 79 and 80, which are rotated only through the medium of their toothed transfer-wheels, located under them on shaft 81. Said transfer-wheels, being indicated by 82 and 83, operate in the usual manner to move said registering-wheels 79 and 80 at each half-revolution, whereby the totals of the said three wheels are made to indicate the total number of revolutions of the first of said wheels 77, said wheels 77, 79, and 80 representing the units, tens, and hundreds, respectively. Similar means are employed for preventing overthrow by said ratchet-wheel 74 when a key is struck violently to those employed for the same purpose for operating against the overthrow of sleeve 42—viz., the star-wheel 75 is secured on a sleeve 76 and the teeth of said wheel are at proper times engaged by a pawl 85, which is forcibly held in such engagement and released therefrom just before said sleeve is to be rotated again. A spring 84 (see Fig. 4) at all times holds the pawl 85 of said ratchet-wheel 74 in light contact with the teeth of said wheel and serves somewhat as a break to the movement thereof. The said star-wheel and pawl are operated by the rocker-plate and an arm thereon, as described in the operation of the ratchet-wheel 68 on sleeve 37. Said locking devices for sleeve 76 are shown in side elevation in Fig. 4.

The essential feature of this counting and registering mechanism consists in the construction thereof which effects the direct registration of all amounts from the dollar key-bank directly on the unit dollar-wheel 77 and also the registration on the same wheel 77 of one-dollar amounts made up from the registration of fractional parts of one dollar, as on wheel 64, operated by another key-bank, the sum of the amounts from both key-banks being carried to the wheel 79 and from that to wheel 80. This transfer from 77 to 79 and 80 is performed in the manner common to all the so-called "Geneva counters," but the operation of registration on wheel 77, the dollar units-wheel, and the transfer thereto of the sum registered by one revolution of the wheel 64, operated by the five-cent key-bank, is as follows: As has been stated, the wheel 77 is secured to the long sleeve 76 and rotated by the upward movement of the rack-frame 47. One face of said wheel 77 is cupped out, and within said cupped face lies the ratchet-wheel 87, which is loose on said sleeve 76, and next to said ratchet lies the toothed wheel 88, and is secured thereto by pins or otherwise. A pawl 86 is secured pivotally to the face of the wheel 77 in such position as to engage the teeth of the ratchet-wheel 87, and is held in such engagement by a spring in the usual manner. The ratchet-wheel 87, being secured to the toothed wheel or gear 88, which is in mesh with the similarly-toothed wheel 66, integral with the locking-wheel 67, which is held against rotation, except at certain periods, as has already been stated, it follows that when the wheel 77 is rotated by the depression of a key of the dollar-bank said pawl 86, attached to the said wheel, will ride over the teeth of its ratchet without moving it, and when said key is released and is moved up again to its normal position by the descent of the rocker-plate that the pawl 73 of the ratchet-wheel 74 will in its turn ride over the teeth of its ratchet, leaving the said wheel 77 where it was stopped when the said key reached its lowest limit of movement. From the above it is seen that while said wheel 77 receives and registers directly through pinion 72 and the long sleeve 76 it does not move the ratchet-wheel 87 or the gear 88, yet it can at all times be moved by the movement of said gear and ratchet, through the medium of the pawl 86, in one direction, and that movement is given to it whenever the registering-wheel 64 of the five-cent bank has made one revolution and the single-toothed transfer-wheel 65 engages with a tooth of the gear or toothed wheel 66 on the shaft 81.

It is obvious from the above description that since the registration of dollar amounts from one key-bank takes place on the upstroke of the rocker-plate in one direction and the registration of the fractional amounts of a dollar received from another key-bank takes place on the stroke thereof in another direction the said amounts from two separate key-banks of a cash-registering machine may both be registered separately on different wheels and the total of one of said separate registering-wheels carried to the other at proper intervals and these two amounts as a total transferred from said other wheel in the usual manner, thus necessitating but one mechanism, which is at the same time a counting and registering mechanism and adding mechanism.

In Figs. 14, 15, and 16 of the drawings is illustrated means for muffling the bell from outside of the case and of locking it on the inside of the case, so that it cannot be made to strike again except by unlocking the case and releasing it. The bell can thus be muffled by the operator, or it can be locked by the proprietor and taken out of the control of the operator, if it is so desired, by the locking of the door in the casing of the machine, and the construction of said mechanism is as follows:

In Fig. 16, 89 represents the casing of the cash-register, a door 90 being hinged thereto and secured by a lock 91. A plate 92 is secured to the inside frame A at any convenient place thereon. Said plate has attached thereto the bell 93 and its operating and locking or muffling mechanism. The bell 93 is secured on a post 94 in said plate, and in operative proximity thereto is the hammer-lever 95, pivotally secured at 96 to said plate 92. Said lever 95 has an arm 97, as shown, to which a spring 98 is attached by one end, the other end of said spring being secured to a part of said plate 92. An arm 99, integral with plate 92, stands at right angles thereto in such position that one end of the pivoted lever 100 thereon will be engaged and operated by the rocker-plate C' on its upward stroke, and the other end of said pivoted lever will engage the arm 97 of the hammer-lever 95. As the rocker-plate raises one end of the lever 100 the other end depresses the arm of the hammer-lever 95 against the action of said spring 98, and when said lever 100 is released from the rocker-plate by the continued upward movement thereof said spring, contracting, strikes the hammer against the bell, causing it to ring. Enough freedom of movement is given to lever 100 between its point of contact with arm 97 and the stop-pin 101 to permit the rocker-plate to pass by the end of the said lever 100, the end of which lever bears on the arm 97, being heavy enough to overbalance the other and always keep said end in contact with said arm. To muffle said bell, a perpendicular rod 102 is suitably supported on plate 92 by the two projecting arms 103 and 104, cast on said plate. The said rod has a reciprocating rotary movement in its supports and has attached to its lower end, between said two supports, a cam-piece 105, having two sides thereof faced off to engage the pivoted locking-lever 106, whereby when said lever engages one of said faces it locks said cam-piece in engagement with the hammer 107 on said hammer-lever, thereby preventing the ringing of the bell when its mechanism is actuated by the rocker-plate, and when said lever engages the other of said faces on said cam-piece it locks it in a position which allows free movement of said hammer-arm, permitting the bell to ring on the depression of each key. The positive locking and unlocking of the said cam-piece can only be effected from the inside of the casing 89. As aforesaid, however, the proprietor can throw the locking-lever 106 sufficiently far to one side to permit the free rotary movement of the rod 102, and thus put the bell-muffling device under the control of the operator, who can manipulate the said rod from the outside of the case of the machine to either allow the bell to be rung or not, as desired. When the said rod 102 is rotated to lock the bell—viz., to rotate the cam-piece 105 from the position shown in said Fig. 15 to that shown in Fig. 14 and in dotted lines in said Fig. 15—the curved edge of said cam-piece impinges on the edge of the beveled face of the hammer and forces it back away from said bell and remains interposed between said hammer and bell until removed by the turning of the rod 102.

Having thus described my invention, what I claim, and desire to secure by Letters Patent, is—

1. In a cash registering and indicating machine, the combination, with a series of keys, of a locking device moved upon the actuation of any key or keys into contact with the remaining keys, a holding device brought into contact with said locking device to hold the locking device against said remaining keys, and means controlled by the actuated key whereby, upon the return of the key to its normal position, the holding device is first removed from the locking device and the locking device is then removed from said remaining keys, substantially as described.

2. In a cash registering and indicating machine, means for effecting the locking of the stationary keys of machines of this class, consisting of the pivotally-hung rocker-bar 10, having an arm or arms 12, a spring $13^a$, for imparting rocking motion to said bar 10, and a rod or rods 13, secured to the rocker-plate C', and having engagements with said arm or arms 12, for holding said bar 10, out of engagement with the depending wings of the said keys, and means for automatically locking and unlocking said bar 10, consisting of the spring-actuated lever 14, for engaging the end of the arm 12, and a rod 15, secured to the rocker-plate C', for disengaging said lever 14, from said arm 12, substantially as set forth.

3. In a cash registering and indicating machine, having two or more banks of keys, the combination of means for preventing the simultaneous actuation of more than one key in each bank, and means connected with the series of keys for preventing, after the actuation of any key in any one bank, the subsequent actuation of any key in any other bank, until the return of the first key to its normal position, substantially as described.

4. In a cash registering and indicating machine having two or more banks of keys, and one rocker-plate common to all of said banks, means for coupling an operated key to said rocker-plate consisting of a plate 3, suitably supported on said rocker-plate and having the notches 4, 4, in one of its edges, and means for imparting to said plate an endwise movement on said rocker-plate, substantially as described.

5. In a cash registering and indicating machine having two or more banks of keys, and one rocker-plate common to all of said banks, means for coupling an operated key to said rocker-plate consisting of a plate 3, suitably supported on said rocker-plate and having the notches 4, 4, in its free edge, said notches lying normally opposite the hooked arms 7, on the keys C, and means for imparting to said plate 3, endwise motion whereby the portions of said plate between said notches are moved to a position vertically over said keys C, substantially as described.

6. In a cash registering and indicating machine having two or more banks of keys, and one rocker-plate common to all of said banks, means for coupling an operated key to said rocker-plate consisting of a plate 3, suitably supported on said rocker-plate having the notches 4, 4, in its free edge, said notches lying normally opposite the hooked arms 7, on the keys C, and means for imparting reciprocating endwise motion to said plate 3, consisting of two oppositely-inclined cam-surfaces at each end thereof, whereby the portions of said plate between said notches are moved to a position vertically over said keys C, and back again, respectively, upon the ascent and descent of said rocker-plate, substantially as set forth.

7. In a cash registering and indicating machine, the combination, with a rocker-plate common to the series of keys, of adjustable stops above or below said plate so situated as to limit the movement of the plate in either direction, substantially as described.

8. In a cash registering and indicating machine, a series of keys and a rocker-plate actuated thereby, and adjustable stops secured to a fixed portion of the machine and engaging with said rocker-plate for limiting and controlling the upward and downward movements thereof, substantially as set forth.

9. In a cash registering and indicating machine, a series of keys, a cam-plate having a lateral movement imparted thereto by said keys, and means on said cam-plate for imparting any desired degree of movement to the registering mechanism of said machine, said means consisting of an inclined slot in said cam-plate with which said mechanism is operatively connected, substantially as described.

10. In a cash registering and indicating machine, a series of keys, a cam-plate having a lateral movement imparted thereto in one direction by said keys, and means independent of said keys for imparting lateral movement to said cam-plate in the opposite direction, and a cam-slot in said cam-plate whereby operative movement is imparted to the counting and registering mechanism of said machine, by the movements of said cam-plate, substantially as described.

11. In a cash registering and indicating machine, a series of keys, a cam-plate having a lateral movement imparted thereto by said keys, and a cam-slot in said cam-plate, a vertically-moving rack, and means for imparting movement thereto from said laterally-moving cam-plate, and a counting and registering mechanism for said machine receiving operative movements from the engagement of said vertically-moving rack with a pinion secured to a shaft of said counting and registering mechanism, substantially as described.

12. In a cash registering and indicating machine, a series of keys, a cam-plate having a lateral movement imparted thereto by said keys, and a cam-slot in said cam-plate, a vertically-moving rack, and means for imparting movement thereto from said laterally-moving cam-plate, and a counting and registering mechanism for said machine receiving operative movements from the engagement of said vertically-moving rack with a pinion secured to a shaft of said counting and registering mechanism, and a locking mechanism for said shaft consisting of the ratchet-wheel 68, thereon, and a pawl 69, operated by the rocker-plate C', substantially as described.

13. In a cash registering and indicating machine having two banks of keys and one total adding and registering mechanism for registering and adding amounts of different character on said single mechanism, a separate cam-plate for each of said banks of keys, and receiving movements therefrom, a cam-slot in each of said cam-plates, a vertically-moving rack engaging with each of said cam-slots and moved thereby, the said racks each engaging with a pinion secured to shafts of said total adding and registering mechanism, for effecting the rotation of a portion of said mechanism by the upward movement of one of said racks, and the rotation of another portion thereof by the downward movement of the other of said racks, substantially as described.

14. In a cash registering and indicating machine, the combination, with a series of keys, of a spring-actuated bar adapted to engage the projection of any indicator rod or rods which may be lifted and thus hold down said rod or rods, on their supports.

15. In a cash registering and indicating machine having one or more banks of keys, indicator-carrying rods moved upwardly by the said keys and one spring member which engages with any one or more of said rods during their upward movement, and by which said rods are aided to return to their normal positions, substantially as described.

16. In a cash registering and indicating machine, a series of keys having reciprocating movements in a vertical plane, a series of indicator-rods moved vertically by said keys, and a series of brackets on the frame of the machine for the support of said indicator-rods in their elevated positions, one spring-actuated member adapted to be engaged by any indicator-rod supported on one of said brackets, and a swinging frame pivotally hung to the frame of the machine, one portion of said frame lying back of said line of indicator-rods, and a pivoted lever on the rocker-plate of said machine, which engages a part of said frame on the upward movement of the said rocker-plate, imparting a rocking movement to said swinging frame whereby the ends of any indicator-rods supported on said brackets are forced off therefrom, and a suitable spring for returning said swinging frame to its normal position, substantially as described.

17. In a cash registering and indicating machine, a series of keys C, the rocker-plate C', having thereon the sector 16, to which is secured the pivoted lever 28, a series of indicator-rods having pins 30, therein, a spring-actuated wing 31, with which the pins 30, engage, a swinging frame having a portion 24, thereof engaging the ends of said indicator-rods, and a spring 26, for imparting movements to said frame in one direction, substantially as described.

18. In a cash registering and indicating machine having two or more banks of keys, a rocker-plate common to all of the key-banks, one total adding and registering mechanism for all of said key-banks, a cam-plate for each of said key-banks operated by said keys, in one direction only, cam-slots in said cam-plates for imparting motion to vertical racks, and by which the said counting mechanism is actuated, and means between said rocker-plate and said vertical racks for returning said cam-plates to their normal positions in advance of the descent of the said keys, substantially as described.

19. In a cash registering and indicating machine having two or more banks of keys, a rocker-plate common to all of the key-banks, one total adding and registering mechanism for all of said key-banks, a cam-plate for each of said key-banks operated by said keys in one direction only, cam-slots in said cam-plates for imparting motion to vertical racks and by which the said registering mechanism is actuated, and a stud on said vertical racks engaging with arms on said rocker-plate on the downward movement thereof, and springs 33, on said rack, which are compressed by the vertical movement thereof, whereby said cam-plates are positively returned to their normal positions in advance of the descent of, and without the coöperation of, said keys, substantially as described.

20. In a cash registering and indicating machine having a dollar key-bank and a key-bank for registering centesimal parts of a dollar, a total adding and registering mechanism for receiving separately amounts from each of said key-banks or a compound amount from both of said banks, comprising two interoperative groups of mechanisms, viz., the three wheels 77, 79, and 80, and their coöperating elements constituting the group of the dollar-key-bank registering mechanism, and the wheel 64, and its coöperating elements constituting the group of the bank of keys for registering the centesimal parts of a dollar, and the mechanism located between the said wheels 64 and 77, consisting of the single-toothed transfer-wheel 65, moving with, and by wheel 64, the toothed wheel 66, periodically rotated on shaft 81, by said wheel 65, a second toothed wheel 88, on shaft 37, in engagement with and rotated periodically by said wheel 66, and a ratchet-wheel 87, secured to, and moved by, said wheel 88, said ratchet-wheel imparting movements to the first dollar-wheel 77, by a pawl 86, pivotally secured thereto and engaging with the teeth of said ratchet-wheel, and suitable transfer mechanism between wheel 77, and the wheels 79 and 80, and mechanism for imparting primary movements to each of the said two groups of total adding and registering mechanism, substantially as described.

21. In a cash registering and indicating machine having a dollar key-bank and a key-bank for registering centesimal parts of a dollar, a total adding and registering mechanism for receiving separately amounts from each of said key-banks, or a compound amount from both of said banks and comprising two interoperative groups of mechanism for the purpose described, the wheels 77, 79, and 80, of the first group transferring from one to the other twice during one revolution of each thereof, and the wheel 64, of the first group transferring but once during one revolution of said wheel, combined with the ratchet or star wheels 75 and 68, for periodically arresting the rotation of the hollow shafts 76, and 42, and mechanism secured to a fixed part of the machine for engaging periodically said wheels 75 and 68, substantially as described.

22. Means for periodically holding against rotation the wheel 64, of the within-described total adding and registering mechanism, consisting of the ratchet-wheel 46, secured to said wheel, a pawl-lever 52, pivotally supported on the frame of the machine and engaging the teeth of said ratchet-wheel, a rock-shaft 49, suitably supported on the frame of the machine, and mechanism for rocking said shaft whereby the crank-arm 50, thereon, is periodically interposed between the said pawl-lever 52, and a fixed arm 54, secured to the frame of the machine and thereby preventing, temporarily, the rotation of said ratchet-wheel, substantially as described.

23. Means for periodically holding the wheel 64, of the within-described total adding and registering mechanism consisting of the ratchet-wheel 46, secured to said wheel, a pawl-lever 52, pivotally supported on the frame of the machine and engaging the teeth of said ratchet-wheel, a rock-shaft 49, consisting of a pivoted lever 55, a rod 56, secured pivotally to one end thereof, the opposite end bearing on an arm 51, of said rock-shaft, a spring acting against said arm, an arm 58, on the rocker-plate C', engaging with said rod 56, and a locking-lever 60, made to engage with the under side of lever 55, at certain periods, and to disengage therefrom by the contact with an arm thereon of the arm 58, secured to the rocker-plate C', substantially as described.

24. The herein-described bell-ringing device consisting of a suitably-supported bell 93, a hammer-lever 95, having the arm 97, thereon, pivoted in operative relation to said bell, and a spring for actuating said lever in one direction, a lever 100, pivotally secured to a fixed support, one end of said lever engaging with the end of the arm 97, and the other end of said lever so located as to be operated by the movement of the rocker-plate in one direction, whereby the bell is rung by said movement of the rocker-plate, and means for muffling said bell consisting of a rod 102, rotatably supported within the casing of the machine, one end of said rod extending through said casing, and a cam-piece 105, on said rod for moving and holding the hammer of the bell out of operative relation therewith, substantially as described.

25. Means for controlling the operation of the bell in cash registering and indicating machines, consisting of a suitably-supported cam-piece within the case of the machine for holding the hammer of said bell out of operative relation therewith, and means for operating said cam-piece from the outside of said case, and means within the case for locking said cam-piece in one or more positions, substantially as described.

CHARLES H. LITTLE.

Witnesses:
WM. H. CHAPIN,
K. I. CLEMONS.